United States Patent [19]
Abbott

[11] Patent Number: 5,535,800
[45] Date of Patent: Jul. 16, 1996

[54] PNEUMATIC TIRE FOR EXTENDED MOBILITY FEATURING COMPOSITE RIBS

[75] Inventor: John R. Abbott, Cuyahoga Falls, Ohio

[73] Assignee: The Goodyear Tire & Rubber Company, Akron, Ohio

[21] Appl. No.: 342,473

[22] Filed: Nov. 21, 1994

[51] Int. Cl.$^6$ ............................................... B60C 17/06
[52] U.S. Cl. .................. 152/517; 152/523; 152/539; 152/555
[58] Field of Search ........................ 152/517, 156, 152/157, 192, 193, 194, 196–200, 275–277, 523, 555, 343.1, 539

[56] References Cited

U.S. PATENT DOCUMENTS

| | | | |
|---|---|---|---|
| 939,611 | 11/1909 | Midgley | 152/198 |
| 1,229,861 | 6/1917 | Auberlin | 152/156 |
| 1,306,334 | 6/1919 | Gruber | 152/156 |
| 1,311,340 | 7/1919 | Freel | 152/156 |
| 1,345,228 | 6/1920 | Pearson | 152/277 |
| 1,428,817 | 9/1922 | Swan | 152/209 R |
| 3,372,726 | 3/1968 | Sidles | 152/330 |
| 3,421,566 | 1/1969 | Sidles et al. | 152/330 |
| 3,782,440 | 1/1974 | Depmeyer | 152/330 |
| 4,034,792 | 7/1977 | Martin | 152/379.1 |
| 4,111,249 | 9/1978 | Markow | 152/330 RF |
| 4,201,261 | 5/1980 | Bartley et al. | 152/357 A |
| 4,219,066 | 8/1980 | Tamura et al. | 152/353 G |
| 4,341,249 | 7/1982 | Welter | 152/330 RF |
| 5,198,050 | 3/1993 | Gifford | 152/517 |

*Primary Examiner*—Geoffrey L. Knable
*Attorney, Agent, or Firm*—David L. King; Roger D. Emerson

[57] ABSTRACT

A pneumatic runflat tire includes ribs mounted axially outwardly of the carcass ply. The ribs are each made of a non-elastomeric material. The preferred rib is compound composite material having first, second, and third layers. The first and third layers of the rib are a fiberglass and epoxy composite and the second layer is an elastomer. The ribs provide primarily radial stiffness support capability of a sufficient level to support the weight of the vehicle in the absence of tire inflation.

12 Claims, 4 Drawing Sheets

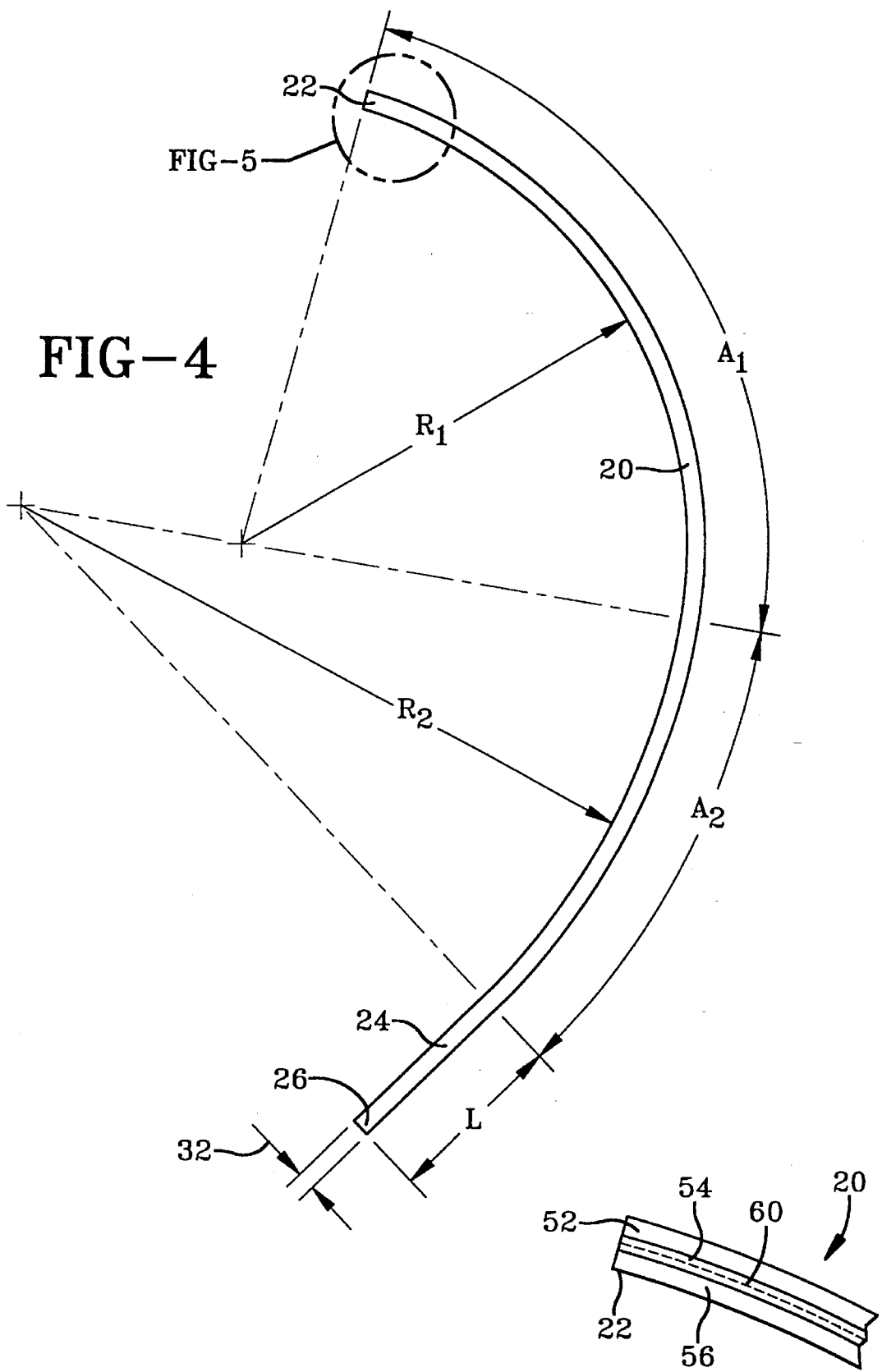

PNEUMATIC TIRE FOR EXTENDED MOBILITY FEATURING COMPOSITE RIBS

BACKGROUND OF THE INVENTION

This invention pertains to the art of tires capable of limited use upon loss of inflation, i.e., runflat or extended mobility tires, and more particularly to such extended mobility tires utilizing stiffening or supporting members in the sidewalls of the tire.

RELATED ART

Tire designers have long sought a tire which provided acceptable performance upon sudden, unexpected deflation, such as a tire puncture. The goal has proven elusive. U.S. Pat. No. 4,341,249 to Welter discloses a tire design with ribs which are mounted on the interior or exterior surfaces of the tire shoulders. The ribs are made of an elastomeric material such as rubber and are an integral part of the tire sidewall.

U.S. Pat. No. 3,782,440 to Depmeyer discloses a tire whose inside surface of the sidewalls are reinforced by ribs which are integral with the sidewalls, also being made of rubber.

U.S. Pat. Nos. 3,372,726 and 3,421,566 to Sidles and Sidles et al., respectively, disclose tire designs featuring ribs on the exterior surface of the tire sidewall which purportedly support the tire upon deflation.

In all of these designs, the rib in question is manufactured as an integral part of the tire component to which it is adjoined. The rib is manufactured of the same material as the tire sidewall to which it is adjoined. Because of the elastomeric material used to manufacture these ribs, the ribs were necessarily of large mass to provide the required stiffness and strength. Because of the large mass, significant hysteresis losses were an inevitable side effect of the design. These hysteresis losses contributed to unacceptable tire rolling resistance, a tire parameter directly affecting the gas mileage of the vehicle upon which the tire was mounted. Due to the unacceptable performance described above, further improvements in a runflat design were desirable.

The present invention contemplates a new and improved extended mobility tire which is simple in design and which overcomes the foregoing difficulties and others while providing better and more advantageous overall results.

SUMMARY OF THE INVENTION

Still other benefits and advantages of the invention will become apparent to those skilled in the art to which it pertains upon a reading and understanding of the following detailed specification.

According to one aspect of the invention, a pneumatic tire comprises a pair of annular beads, a plurality of ribs, and a tread disposed over the outer end of one of the ribs. The ribs are made of a rib material which is generally non-elastomeric. The tread is made of a tread material which is elastomeric. The tire further includes elastomeric sidewalls disposed between the tread and the beads. First and second carcass plies are wrapped around the beads with the ribs being between the first and second carcass ply.

According to another aspect of the invention, the tire includes bead strips which tie the ribs to the bead instead of carcass plies. The tire may also include reinforcing belts between carcass plies and the tread. The bead and ribs may be made of the same material, such as fiberglass, and may be manufactured as a unit.

According to another aspect of the invention, the ribs are manufactured of polyetheretherketone (also known as "PEEK").

According to another aspect of the invention, a support member for use in a pneumatic tire includes a rib mounted within the tire between the associated wheel and tread. The rib is primarily made of a first rib material which is non-elastomeric and is preferably a fiberglass and epoxy composite.

According to another aspect of the invention, the rib is a compound composite having first, second and third layers with the first layer being made of the first rib material, the second layer being made of the second rib material, and the third layer being made of a third rib material.

According to another aspect of the invention, the support member is generally shaped like a cross sectional shape of one half of the tire into which the support member fits.

According to another aspect of the invention, the rib is generally arcuately shaped and is defined by a first radius R1 and a second radius R2. The first radius R1 is between 1.0 inch (2.54 cm) and 3 inches (7.62 cm) and the second radius R2 is between 2.0 inches and 4.0 inches (10.16 cm).

According to another aspect of the invention, the first layer of the rib has a thickness between 0.060 inches (0.152 cm) and 0.080 inches (0.203 cm).

One advantage of the invention is the provision of a pneumatic tire offering runflat capability.

Another advantage of the invention is the provision of a rib manufactured of a unique arrangement of materials which provides requisite strength and other performance qualities to provide acceptable performance in a tire having no or low inflation pressure.

Another advantage of the invention is the provision of a support member capable of supporting vehicle load while providing low hysteresis losses, and therefore acceptable rolling resistance performance.

Another advantage of the invention is the provision of a runflat device which can be fitted on a conventional rim without the need of special tools or equipment.

Another advantage of the invention is the provision of bead strips which can at least temporarily eliminate the need for carcass plies.

Another advantage of the invention is the provision of tire beads and ribs made of the same material and capable of being manufactured at the same time as an integral unit. This advantage results in lower manufacturing costs and more secure linking of the tire body to the tire bead.

Another advantage of the invention is the provision of a composite rib design capable of withstanding large bending stresses at the neutral axis of the rib design.

Another advantage of the invention is the provision of a tire where all components of the tire can be cured simultaneously in a single step.

Still other benefits and advantages of the invention will become apparent to those skilled in the art upon a reading and understanding of the following detailed specification.

BRIEF DESCRIPTION OF THE DRAWINGS

The invention may take physical form in certain parts and certain arrangement of parts, a preferred embodiment of which will be described in detail in the specification and illustrated in the accompanying drawings, which form a part hereof and wherein:

FIG. 4 is a side view of a rib according to the invention.

FIG. 5 is an enlarged view of a radially outer end of a rib, showing the three layers of the rib.

DETAILED DESCRIPTION OF THE INVENTION

Figure 1:
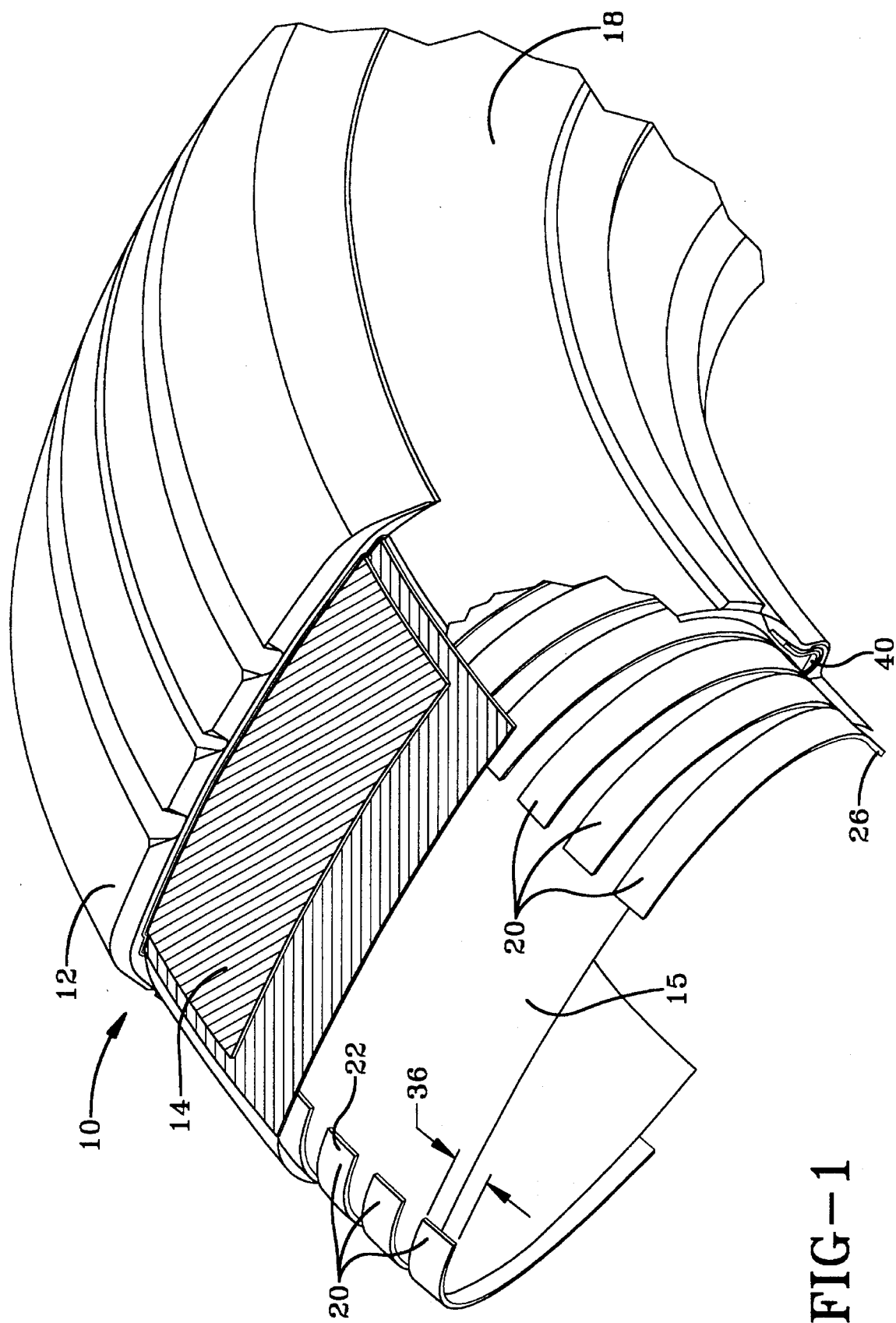
FIG. 1 is a perspective elevational view of a tire incorporating the invention and shown in partial cross-section.

In the drawings, the same numerals are used to designate the same components or items in several views.

Figure 3:
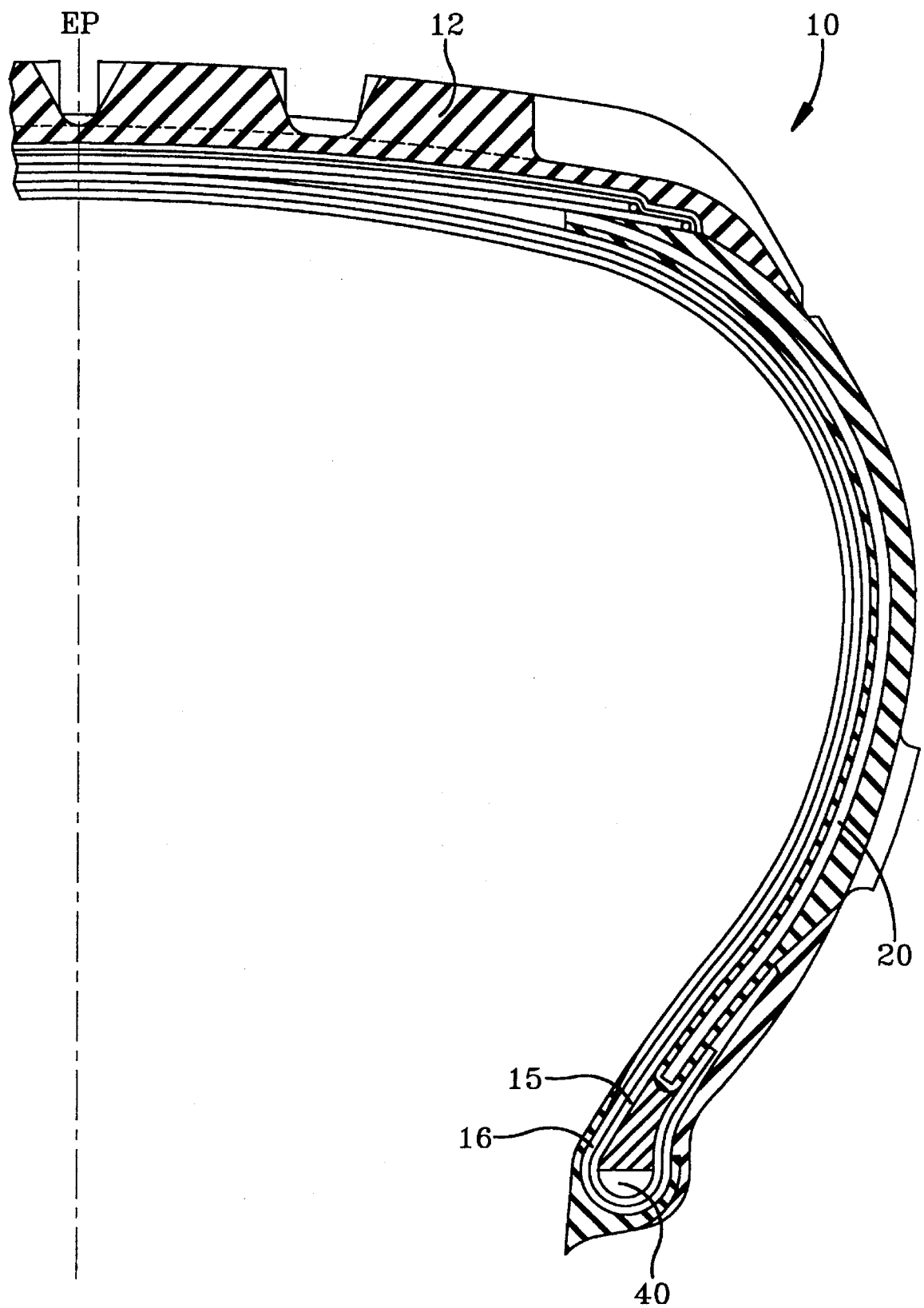
FIG. 3 is a cross-sectional view of one-half of the tire according to the invention.

With reference to FIGS. 1 and 3, a tire 10 according to the invention is illustrated. The tire 10 may incorporate conventional tire components such as a tread 12, reinforcing belts 14, first carcass ply 15 and second carcass ply 16, and sidewalls 18. Other tire components such as an apex and chipper can also be included. One novel feature of the tire 10 is the provision of support members or ribs 20. The ribs 20 are built into the tire 10 in the sidewall area to provide mechanical or structural support for the vehicle should inflation pressure be lost.

In the preferred embodiment, the ribs 20 are located radially outwardly of the first carcass ply 15 and the second carcass ply 16. In an alternate embodiment (not shown), the ribs 20 are located between the two carcass plies 15,16.

One important advantage of the invention is the possibility of eliminating tire components due to the presence of the ribs. Although the ribs 20 can coexist with conventional tire components, as illustrated above, it is possible to eliminate many conventional tire components through use of the ribs. For example, the sidewalls 18 of the tire tend to function primarily to enclose pressurized air which in turn supports the vehicle. Since the ribs 20 are capable of supporting the vehicle load without tire inflation pressure, the sidewalls 18 could theoretically be eliminated from the tire. Likewise, the carcass plies 15,16 could theoretically be eliminated.

Another way to link the tire bead core 40 with the ribs 20 is through the use of strips of fabric reinforced rubber, such as bead strips. Such bead strips would not extend as far up the tire sidewall as the carcass plies 15,16 or the sidewall 18. Instead, the bead strips would simply wrap around the bead core 40 and grip the radially inner end 26 of each rib 20.

One foreseeable advantage of the invention is the elimination or reduction in the number of plies necessary for large tires, such as earthmover tires. In large tires of this type, large numbers of plies are necessary to meet the load requirements of the application. The equipment and the loads borne by the equipment are heavy so the tires must be very strong. Unfortunately, the large number of plies leads to heat build up and hysteresis losses, as discussed above. The provision of ribs 20 in such large tires should result in the reduction of the number of plies, leading to cost savings, less heat build up, and less hysteresis losses.

Another important aspect of the invention is the possibility of manufacturing the bead core 40 and the ribs 20 of the same material. For example, the bead core 40 and the ribs 20 can both be made of a fiberglass and epoxy composite, or other materials, since the requirements of the bead cores 40 and the ribs 20 are similar enough to allow them to be made of one material. The bead core 40 and the ribs 20 can also be made of an integral single piece and therefore manufactured at the same time. For example, the bead core 40 and the ribs 20 can be injection molded of appropriately chosen materials such as polyetheretherketone, also known as "PEEK."

With reference to FIG. 5, the preferred rib 20 has first, second and third layers 52, 54, 56 respectively. The first layer 52 is made of a first rib material, the second layer 54 is made of a second rib material and the third layer 56 is made of a third rib material. In the preferred embodiment, the first and third rib material is a fiberglass and epoxy composite. The preferred fiberglass and epoxy composite is about 70% fiberglass and 30% epoxy although the specific composite design will be dictated by the specific application. Interposed between the first layer 52 and the third layer 56 is the second layer 54. In the preferred embodiment, the second material 54 is an elastomer. By manufacturing a rib 20 with an elastomeric second layer 54, shear stresses which reach their highest magnitude at the neutral axis 60 can be absorbed effectually by the elastomer. By configuring the rib 20 so that it has the three layers 52, 54, 56 made of the materials described above, the fiberglass and epoxy elements provide the requisite stiffness to maintain the load of the vehicle while the elastomeric second layer 54 is able to withstand the shear stresses associated with the deflections associated with tire components.

Figure 2:
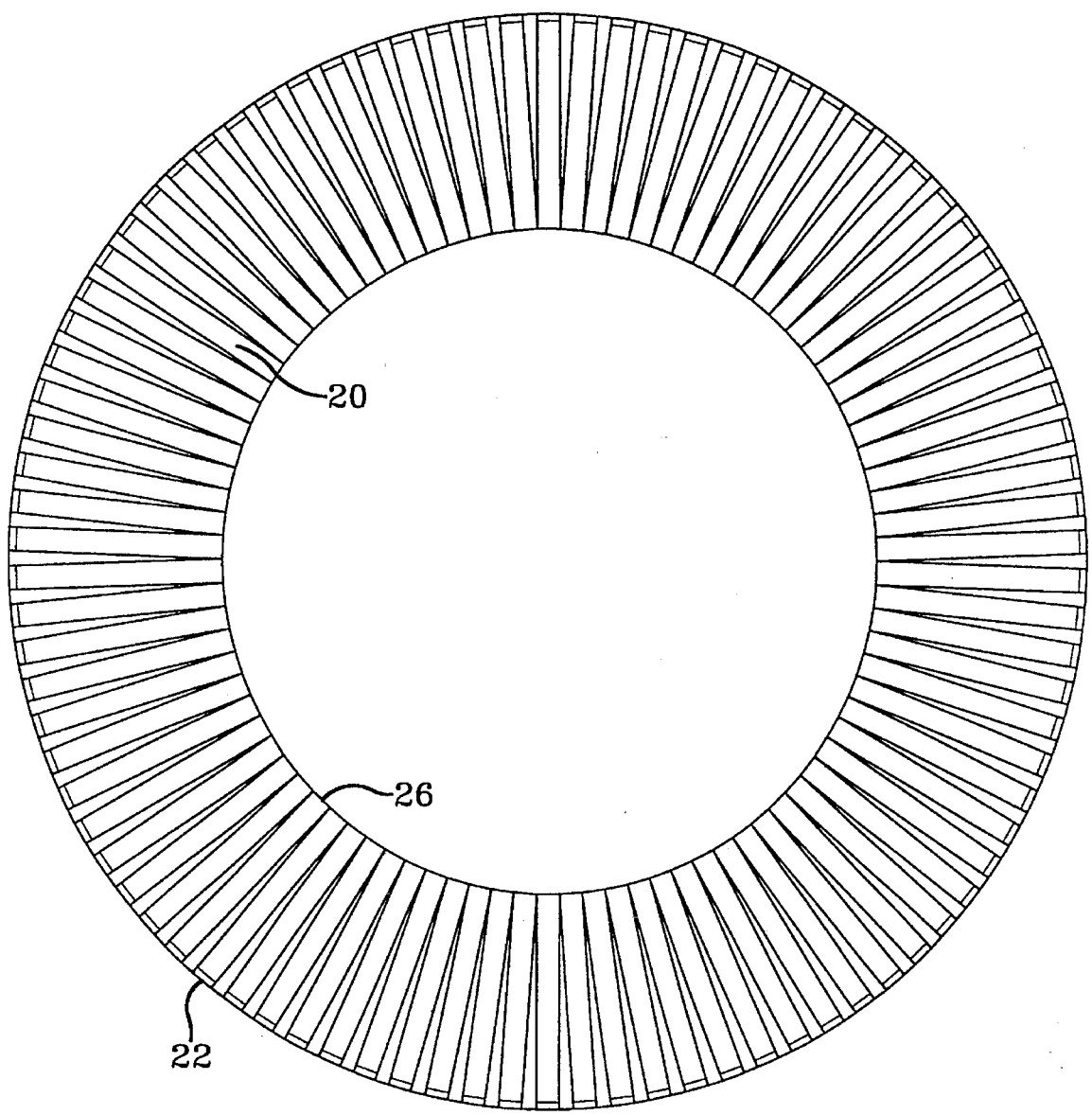
FIG. 2 is a side, elevational, schematic view of a plurality of ribs according to the invention as they might be arranged in a tire.

With reference to FIG. 2, the number of ribs 20 placed into the tire 10 is determined according to the strength of the ribs 20 and the load requirement of the particular vehicle and application in question. The minimum spacing between the ribs 20 is 0.001 inches (0.00254 cm). In one preferred embodiment, a P215/70HR15 Goodyear Eagle GA, 204 ribs were used.

The geometry of the ribs 20 is the function of the tire size and aspect ratio. Ribs 20 could be used as a means to provide strength and reduce the number of plies in a wide variety of tire designs, including earthmover, aircraft, truck, and passenger. The range of radii and arc lengths in each of the tire designs would vary in accordance with the cross-sectional shape of the tire design in question. Nonetheless, a preferred rib design will be disclosed.

With reference to FIG. 4, a preferred rib 20 design as used in a P215/70HR15 Goodyear Eagle GA tire will be described. The rib 20 is best described by reference to first and second radii R1 and R2, respectively. The first radius R1 can be between 1 inch (2.54 cm) and 3 inches (7.62 cm) and is preferably equal to 1.93 inches (4.90 cm). The first radius R1 describes a first arc A1 and the radially outer end 22 of the rib 20. The first arc A1 is between 60 degrees and 100 degrees and in the preferred embodiment is equal to 80 degrees.

The radially inner portion of the rib 20 nearest the radially inner end of the rib 20 is described by second radius R2. The second radius R2 is between 2.0 inches (5.08 cm) and 4 inches (10.16 cm) and the preferred embodiment is 2.93 inches (7.44 cm). The second radius R2 describes a second arc A2 which is between 60 degrees and 100 degrees and is preferably equal to 79 degrees.

The radially innermost segment 24 of the rib 20 terminates in an radially innermost end 26 and is essentially linear, having a length of 0.75 inches (1.9 cm).

The thickness 32 of the rib 20, in the preferred embodiment, is 0.070 inches (0.178 cm), but can be between 0.04 inches (0.10 cm) and 0.1 inch (0.25 cm). The width 36 of the ribs 20 should be between 0.1 inches (0.25 cm) and 0.5 inches (0.13 cm) with the preferred width for the tire size of P215/70HR15 Goodyear Eagle GA being 0.25 inches (0.635 cm).

The preferred relationship between the thickness 32 of the rib 20 and the width of the rib 20 is that the thickness of the rib 20 should be between 10% and 45% of the width of the rib 20. In the preferred embodiment, the thickness of the rib is 28% of the width of the rib, at least in the P215/70HR15 Goodyear Eagle GA described above. The overall length of each rib 20 in this precise tire is 5.55 inches (14.10 cm), although the specific dimensions of the ribs 20 will depend on the specific tire in each application. The materials described above and the materials used combined to create a rib 20 with the requisite strength and flexibility to support vehicle loads with an acceptable degree of comfort to the rider. The materials chosen and the design of the rib 20 is such that the modulus of elasticity of the first layer 52 of the rib 20 is between 3 million pounds per square inch (2.1 billion kilogram/square centimeters) and 19 million pounds per square inch (13.4 billion kilogram/square centimeters). The fiberglass filaments within the rib 20 are preferably unidirectional, being aligned with the axis of the rib 20. The fiberglass and epoxy composite comprises between five and nine laminates of fiberglass and epoxy, The invention has been described with reference to a preferred embodiment. Obviously, modifications and alterations will occur to others upon a reading and understanding of this specification. It is intended to include all such modifications and alterations insofar as they come within the scope of the appended claims or the equivalents thereof.

What is claimed is:

1. A pneumatic tire comprising:

a pair of annular bead cores;

a pair of rib sets, each rib set comprising a plurality of ribs, each of said ribs having a radially inner and a radially outer end, said radially inner end of said ribs of one rib set being near one of said bead cores and associated therewith, said radially inner end of said ribs of the other rib set being near the other bead core and associated therewith, each of said ribs comprising a first rib material, said first rib material being non-elastomeric, each of said ribs extending radially outwardly from said associated bead cores; and, a tread disposed over said radially outer ends of said ribs in a crown area of said tire, said tread being made of a tread material, said tread material being elastomeric;

sidewalls disposed between said tread and said bead cores, said sidewalls being axially outward of said ribs, said sidewalls being made of a sidewall material, said sidewall material being elastomeric; and, a first carcass ply, said first carcass ply being axially inward of said sidewalls, said first carcass ply wrapping around said radially inner end of each of said ribs and said associated bead cores.

2. The pneumatic tire of claim 1 wherein each of said ribs has a region extending from said radially inner end, said region being axially outward of said first carcass ply.

3. The pneumatic tire of claim 1 wherein said tire further comprises:

a second carcass ply, wrapped around said bead cores, each of said ribs being between said first and second carcass plies.

4. The pneumatic tire of claim 1 wherein said tire further comprises:

bead strips, said bead strips comprising fabric-reinforced rubber and extending between said radially inner ends of said ribs and said associated bead cores, said bead strips wrapping around said associated bead cores to tie said ribs to said bead cores.

5. The pneumatic tire of claim 1 wherein said bead core and said ribs are made of polyetheretherketone.

6. A pneumatic tire comprising:

a pair of annular bead cores;

a pair of rib sets, each rib set comprising a plurality of ribs, each of said ribs having a radially inner and a radially outer end, said radially inner end of said ribs of one rib set being near one of said bead cores and associated therewith, said radially inner end of said ribs of the other rib set being near the other bead core and associated therewith, each of said ribs comprising first and second rib material, said first rib material being a fiberglass composite, said second rib material being an elastomer, each of said ribs extending radially outward from said associated bead core;

bead strips, said bead strips comprising fiber-reinforced rubber and extending between said radially inner ends of said ribs and said associated bead cores, said bead strips wrapping around said associated bead cores to tie said ribs to said bead cores; and, a tread disposed over said radially outer ends of said ribs in a crown area of said tire, said tread being made of a tread material, said tread material being elastomeric.

7. The pneumatic tire of claim 6 further comprising:

sidewalls disposed between said tread and said beads, said sidewalls being axially outward of said ribs, said sidewalls being made of a sidewall material, said sidewall material being elastomeric.

8. The pneumatic tire of claim 6 wherein each of said ribs is generally arcuately shaped and is defined by a first radius R1, a second radius R2, and a linear segment, said first radius R1 being between 1.0 inches (2.54 cm) and 3.0 inches (7.62 cm) and said second radius R2 being between 2.0 inches (5.08 cm) and 4.0 inches (10.16 cm), said radially outer end being defined by said first radius R1, said radially inner end being defined by said linear segment, and said second radius R2 defining a portion of said rib extending between said radially outer end and said radially inner end.

9. The pneumatic tire of claim 6 wherein said fiberglass composite comprises between five and nine laminates of fiberglass and epoxy.

10. The pneumatic tire of claim 9 wherein said fiberglass comprises unidirectional filaments.

11. The pneumatic tire of claim 6 wherein said rib further comprises first, second and third layers, said first and third layers comprising said first rib material, said second layer comprising said second rib material, said second layer being disposed between said first and third layers.

12. The pneumatic tire of claim 11 wherein said first rib material is stiffer than said second rib material.

* * * * *